(12) United States Patent
Lee

(10) Patent No.: US 12,515,564 B2
(45) Date of Patent: Jan. 6, 2026

(54) LATCH ASSEMBLY

(71) Applicant: Daechang Seat Co., LTD—Dongtan, Hwaseong-si (KR)

(72) Inventor: Myung Soo Lee, Osan-si (KR)

(73) Assignee: Daechang Seat Co., LTD—Dongtan, Hwaseong-si (KR)

( * ) Notice: Subject to any disclaimer, the term of this patent is extended or adjusted under 35 U.S.C. 154(b) by 172 days.

(21) Appl. No.: 18/609,579

(22) Filed: Mar. 19, 2024

(65) Prior Publication Data

US 2024/0336165 A1 Oct. 10, 2024

(30) Foreign Application Priority Data

Apr. 6, 2023 (KR) ........................ 10-2023-0045452

(51) Int. Cl.
*B60N 2/22* (2006.01)
*B60N 2/015* (2006.01)
*B60N 2/36* (2006.01)
*B60N 2/42* (2006.01)

(52) U.S. Cl.
CPC ........ *B60N 2/01516* (2013.01); *B60N 2/2245* (2013.01); *B60N 2/366* (2013.01); *B60N 2/4249* (2013.01)

(58) Field of Classification Search
CPC ..... B60N 2/2245; B60N 2/366; B60N 2/4249
See application file for complete search history.

(56) References Cited

U.S. PATENT DOCUMENTS

| | | | | |
|---|---|---|---|---|
| 6,705,679 | B1 * | 3/2004 | Zelmanov | B60N 2/2245 297/378.12 |
| 7,410,217 | B2 * | 8/2008 | Inoue | B60N 2/366 297/378.13 |
| 10,155,460 | B2 * | 12/2018 | Schug | B60N 2/01583 |
| 2005/0242647 | A1 * | 11/2005 | Kim | B60N 2/2245 297/354.12 |

FOREIGN PATENT DOCUMENTS

| | | | | |
|---|---|---|---|---|
| CN | 111186349 A | * | 5/2020 | B60N 2/6671 |
| KR | 10-2163881 B1 | | 10/2020 | |

* cited by examiner

*Primary Examiner* — Syed A Islam
(74) *Attorney, Agent, or Firm* — Bret E. Field; Bozicevic, Field & Francis LLP

(57) ABSTRACT

Proposed is a latch assembly with reduced rattling noise. The latch assembly includes a latch bracket mounted on a seatback frame, and includes a latch having a rear side portion hinge-coupled to the latch bracket, having a front side portion bent downward, and having an end portion provided with a claw portion. Furthermore, the latch assembly includes a cable connected to an upper surface of the latch, a pushing bar positioned below the rear side portion of the latch, a pressing bar horizontally positioned below the claw portion, and a link frame connecting the pushing bar and the pressing bar to each other, the link frame being connected to the latch bracket, and the link frame being configured such that the pressing bar is moved upward when the pushing bar is pressed downward by the latch.

5 Claims, 6 Drawing Sheets

LATCH ASSEMBLY

CROSS REFERENCE TO RELATED APPLICATION

The present application claims priority to Korean Patent Application No. 10-2023-0045452, filed Apr. 6, 2023, the entire contents of which are incorporated herein for all purposes by this reference.

BACKGROUND OF THE INVENTION

Field of the Invention

The present disclosure relates to a latch assembly.

Description of the Related Art

The Korean Patent No. 10-2163881 discloses a latch assembly for controlling a seatback of a vehicle.

In a latch assembly proposed in the Korean Patent NO. 10-2163881, the latch assembly includes: a latch bracket mounted on a seatback frame of a seatback of a vehicle; a latch including a body portion supported on the latch bracket, a claw portion which is bent downward from a front side of the body portion and which has a plurality of fastening grooves spaced apart from each other upward from a lower end of the claw portion, and a bracket coupling portion formed on an upper end of the body portion; a rotation bracket hinge-coupled to the bracket coupling portion; and a cable connected to the rotation bracket.

In the latch assembly described above, since a striker is fixed only in one direction (from upward to downward) by the latch, there is a problem that a rattling noise occurs when the latch assembly is operated.

DOCUMENT OF RELATED ART (Patent Document 1) KR 10-2163881 B1 (published on Oct. 13, 2020)

SUMMARY OF THE INVENTION

Accordingly, the present disclosure has been made keeping in mind the above problems occurring in the related art, and an objective of the present disclosure is to provide a latch assembly with reduced rattling noise.

According to an embodiment, there is provided a latch assembly including: a latch bracket mounted on a seatback frame; a latch having a rear side portion hinge-coupled to the latch bracket, having a front side portion bent downward, and having an end portion provided with a claw portion; a cable connected to an upper surface of the latch; a pushing bar positioned below the rear side portion of the latch; a pressing bar horizontally positioned below the claw portion; and a link frame connecting the pushing bar and the pressing bar to each other, the link frame being connected to the latch bracket, and the link frame being configured such that the pressing bar is moved upward when the pushing bar is pressed downward by the latch.

In addition, according to an embodiment, the latch bracket may include: a coupling portion mounted on the seatback frame; and a supporting plate portion provided vertically on a first side of the coupling portion. Furthermore, a first end of the link frame may be coupled to the pushing bar, a second end of the link frame may be vertically coupled to the pressing bar, and a body of the link frame may be hinge-coupled to the supporting plate portion.

In addition, according to an embodiment, the latch assembly may further include a return spring, the return spring being configured such that a first end of the return spring is coupled to the supporting plate portion and a second end of the return spring is coupled to the pressing bar, and configured to apply an elastic restoring force downward to the pressing bar.

In addition, according to an embodiment, the latch assembly may further include a return spring, the return spring being configured such that a first end of the return spring is coupled to the latch bracket and a second end of the return spring is coupled to the latch, and configured to apply an elastic restoring force downward to the latch.

In addition, according to an embodiment, an end portion of the claw portion may have a shape bent toward the coupling portion.

In the latch assembly according to an embodiment, since the latch and the pressing bar fix the striker in both directions, a fixing force is increased, and the rattling noise is reduced.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
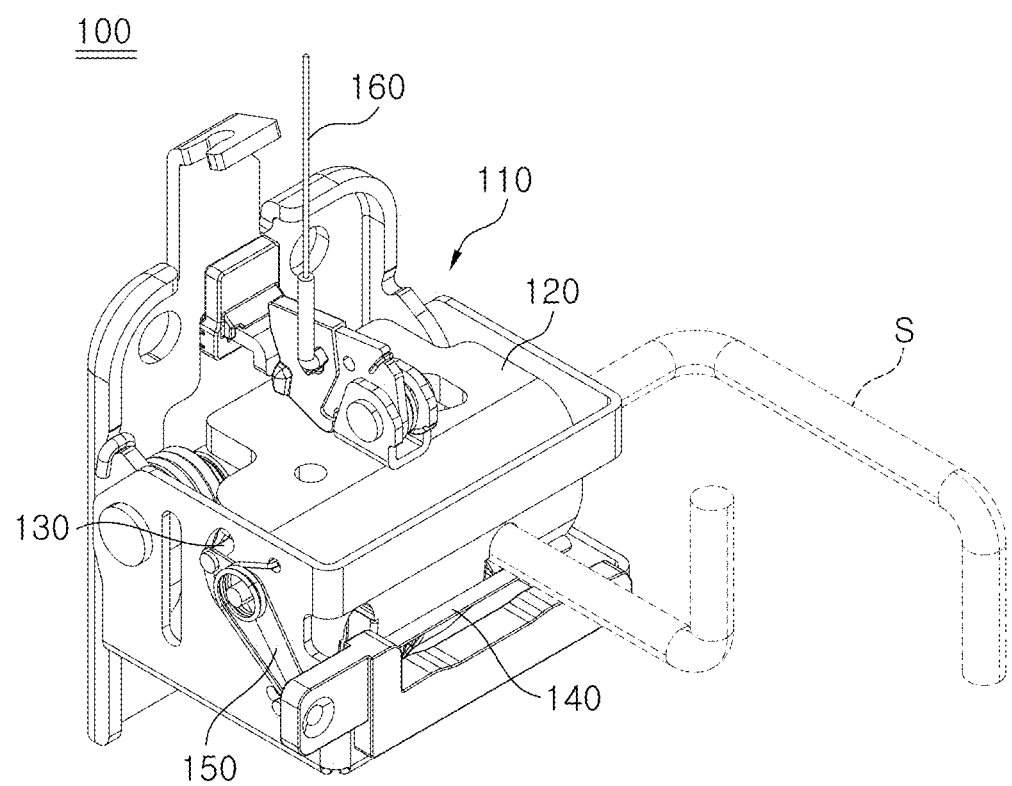
FIG. 1 is a perspective view illustrating a latch assembly according to an embodiment.

Advantages and features of the present disclosure, and methods of achieving e same will become apparent with reference to the embodiments described below in detail in conjunction with the accompanying drawings. However, the present disclosure is not limited to the embodiments disclosed below, but may be implemented in various different forms. The present embodiments are intended to complete the disclosure of the present disclosure and provided to fully inform those skilled in the art to which the disclosure pertains of the scope of the disclosure. The disclosure is defined only by the scope of the claims. Like reference numerals refer to like elements throughout the specification.

Figure 2:
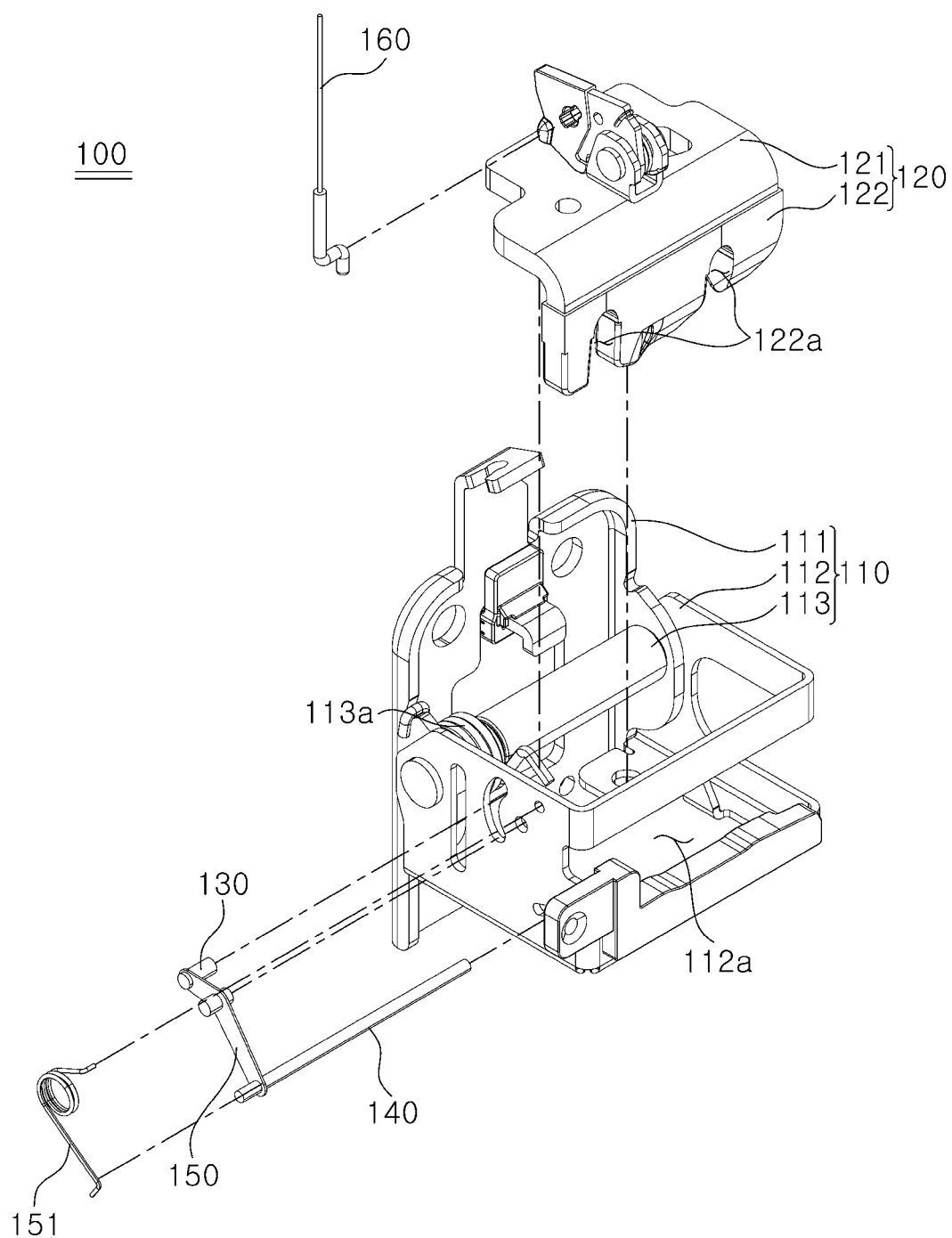
FIG. 2 is an exploded perspective view illustrating the latch assembly according to an embodiment.

Referring to FIG. 1 that is a perspective view of a latch assembly 100 according to an embodiment [hereinafter, referred to as the 'latch assembly 100'] and referring to FIG. 2 that is an exploded perspective view of the latch assembly 100, the latch assembly 100 includes a latch bracket 110, a latch 120, a pushing bar 130, a pressing bar 140, a link frame 150, and a cable 160.

The latch assembly 100 is mounted on a seatback frame, is configured to adjust a seatback, and is coupled to a striker S which protrudes from an adjacent vehicle body and which is coupled to the adjacent vehicle body.

That is, a position is determined by coupling the striker S and the latch 120 that will be described later, and a multi-stage inclination control of the seatback is capable of being performed according to a coupling position of the latch 120.

The latch bracket 110 is mounted on the seatback frame, and includes a coupling portion 111 and a supporting plate portion 112.

The coupling portion 111 has a plate shape, and is coupled to the seatback frame.

The supporting plate portion 112 is provided vertically on a first side of the coupling portion 111. In addition, the supporting plate portion 112 is configured to guide and support the latch 120 that which will be described later, and a guide groove 112 may be formed on front and side surfaces of the supporting plate portion 112 such that the striker S is capable of being coupled to the latch 120.

A hinge portion 113 may be horizontally coupled to the supporting plate portion 112, and the latch 120 is hinge-coupled to the hinge portion 113.

The latch 120 is hinge-coupled to the latch bracket 110. Specifically, the latch 120 includes a body portion 121 and a claw portion 122.

The body portion 121 has a plate shape, and a rear side portion of the body portion 121 is hinge-coupled to the hinge portion 113 of the latch bracket 110.

The claw portion 122 is formed in a shape that is bent downward from a front side portion of the body portion 121. A fastening groove 122a is formed on an end portion of the claw portion 122 such that the striker S is coupled to the claw portion 122. In addition, the end portion of the claw portion 122 may be formed in a shape that is bent toward the coupling portion 111. By forming the claw portion 122 such that the end portion of the claw portion 122 is bent, rotation of the latch 120 may be further prevented when a collision load occurs.

A return spring 113a may be provided on the hinge portion 113 of the latch bracket 110.

A first end of the return spring 113a may be coupled to the latch bracket 110, and a second end of the return spring 113a may be coupled to the latch 120. Specifically, the first end of the return spring 113a is coupled to any one of the coupling portion 111 and the supporting plate portion 112 of the latch bracket 110, the second end of the return spring 113a is coupled to the body portion 121 of the latch 120, so that the return spring 113a is configured to apply an elastic restoring force when the latch 120 is rotated around the hinge portion 113.

The pushing bar 130 is formed in a bar shape having a predetermined length, and is positioned below a rear side portion of the latch 120. Specifically, the pushing bar 130 is positioned directly below the body portion 121 of the latch 120, and is provided on a position where the pressing bar 130 is capable of being moved by the body portion 121 of the latch 120 when the latch 120 is rotated downward.

The pressing bar 140 is formed in a bar shape having a predetermined length, and is horizontally positioned below the claw portion 122 of the latch 120. Specifically, the pressing bar 140 may be formed in a bar shape having a length about a width of the claw portion 122 of the latch 120, and is horizontally positioned below the claw portion 122 of the latch 120. At this time, the pressing bar 140 may be positioned on a front side and below the claw portion 122 of the latch 120.

The link frame 150 connects the pushing bar 130 and the pressing bar 140 to each other and is coupled to the latch bracket 110 such that the pressing bar 140 is moved upward when the pushing bar 130 is pressed downward by the latch 120. Specifically, the link frame 150 is formed in a bar shape in which a cross angle formed by both ends of the link frame 150 is an obtuse angle. Furthermore, a first end of the link frame 150 is coupled to the pushing bar 130 and a second end of the link frame 150 is coupled to the pressing bar 140, and a body of the link frame 150 is hinge-coupled to the supporting plate portion 112 of the latch bracket 110.

A return spring 151 may be provided on the body of the link frame 150.

A first end of the return spring 151 may be coupled to the latch bracket 110, and a second end of the return spring 151 may be coupled to the pressing bar 140. Specifically, the first end of the return spring 151 is coupled to any one of the coupling portion 111 and the supporting plate portion 112 of the latch bracket 110, the second end of the return spring 151 is coupled to the end portion of the pressing bar 140, so that the return spring 151 is configured to apply an elastic restoring force when the pressing bar 140 is rotated around the body of the link frame 150.

The cable 160 is coupled to an upper surface of the latch 120, and serves to lift a front side portion of the latch 120.

Referring to FIGS. 3 to 6 that are usage state views and the side views of the latch assembly 100, an operation method of the latch assembly 100 will be described.

Figure 3:
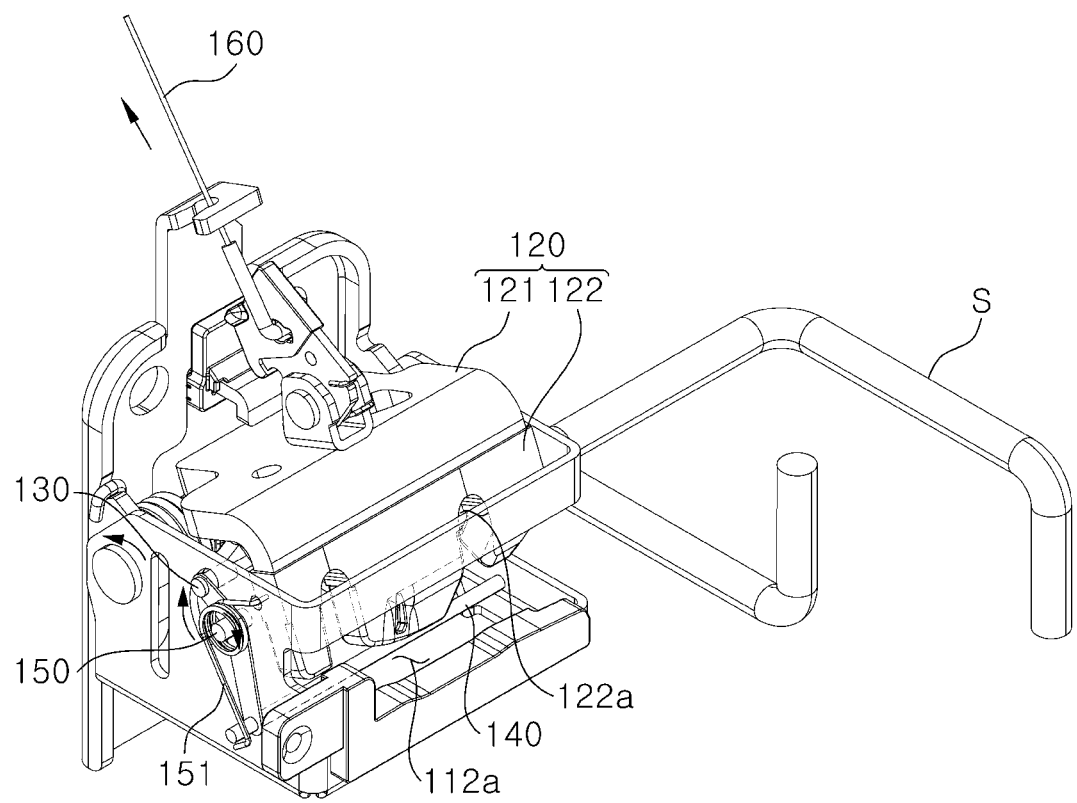
FIG. 3 is a view illustrating a usage state of the latch assembly according to an embodiment.
Figure 4:
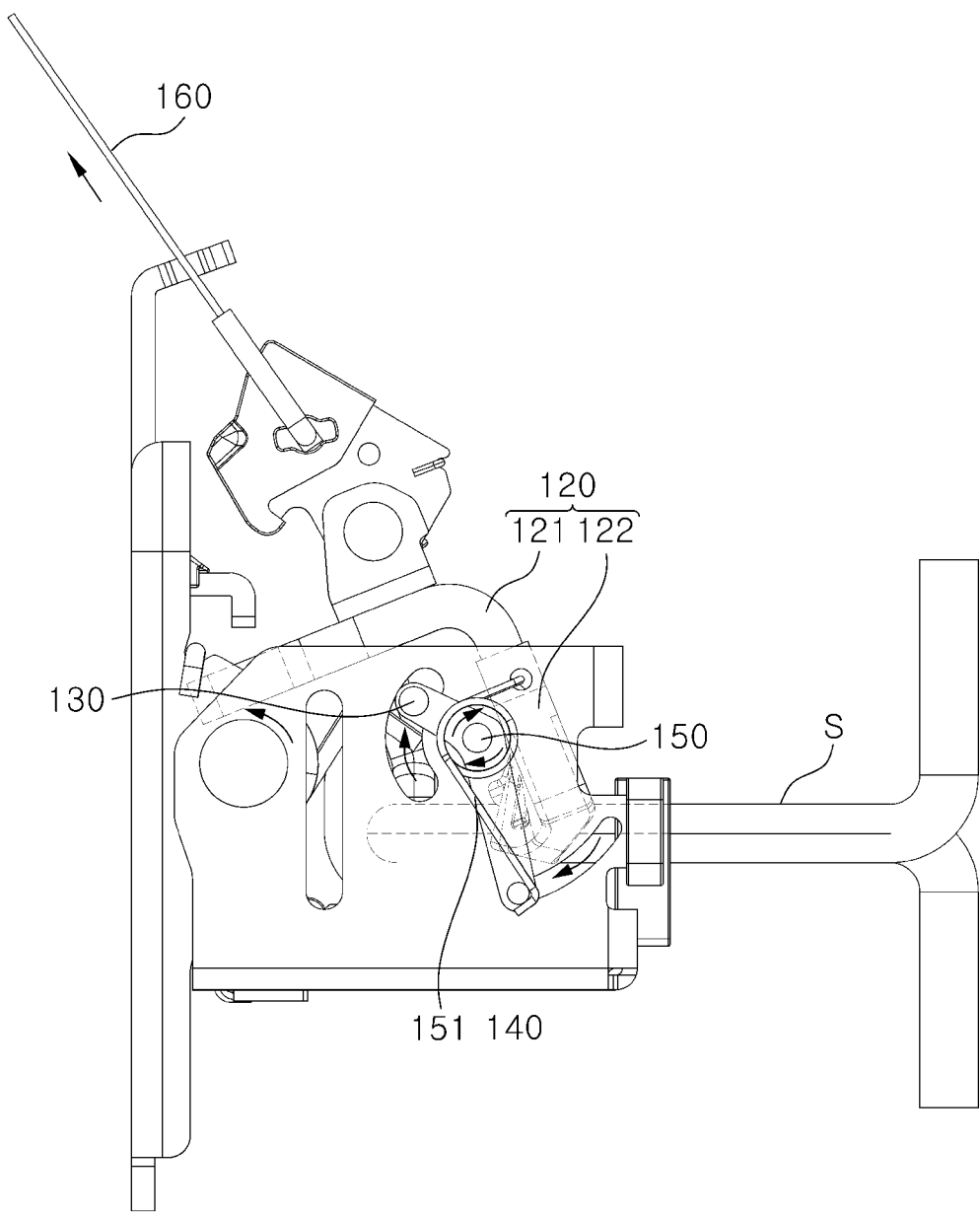
FIG. 4 is a side view of FIG. 3.

Referring to FIG. 3 and FIG. 4 that is the side view of FIG. 3, when the cable 160 is towed upward, the latch 120 that pressed the pushing bar 130 downward is rotated upward. When a force pressing the pushing bar 130 downward is removed by rotating the latch 120 upward, the pressing bar 140 is rotated downward with respect to the body of the link frame 150 by the return spring 151.

Since the latch 120 is rotated upward and the pressing bar 140 is rotated downward, the striker S is separated from the fastening groove 122a of the claw portion 122. As a result, the seatback is in a state in which a user is capable of adjusting an angle of the seatback.

Figure 5:
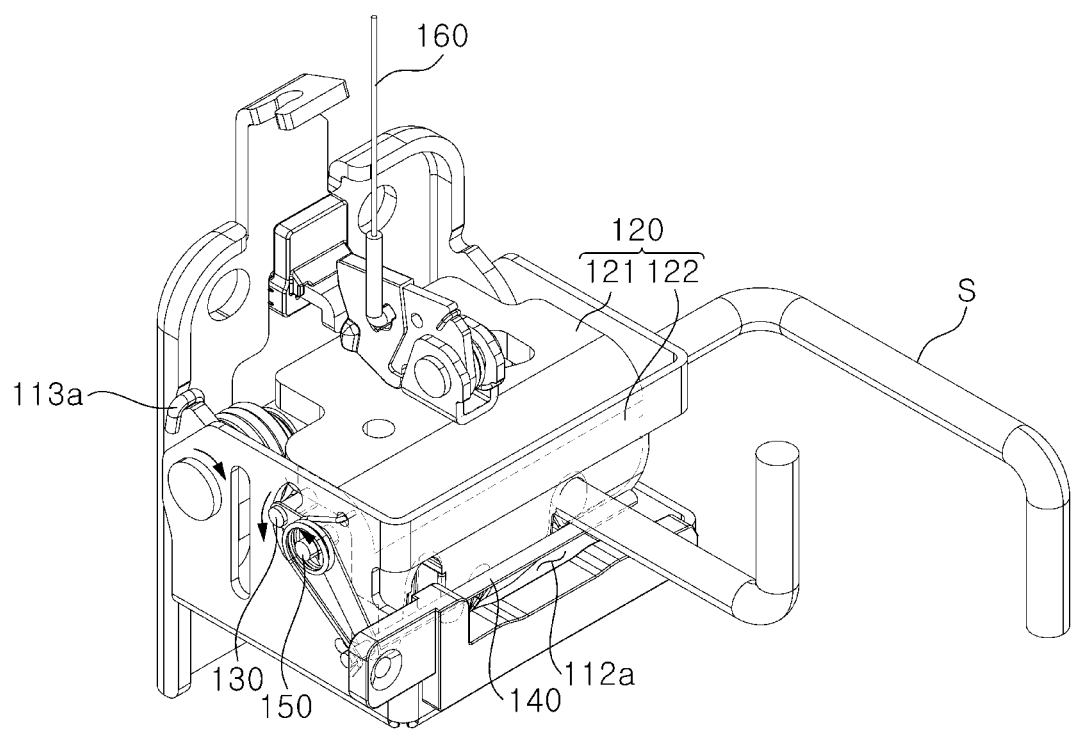
FIG. 5 is a view illustrating the usage state of the latch assembly according to an embodiment.
Figure 6:
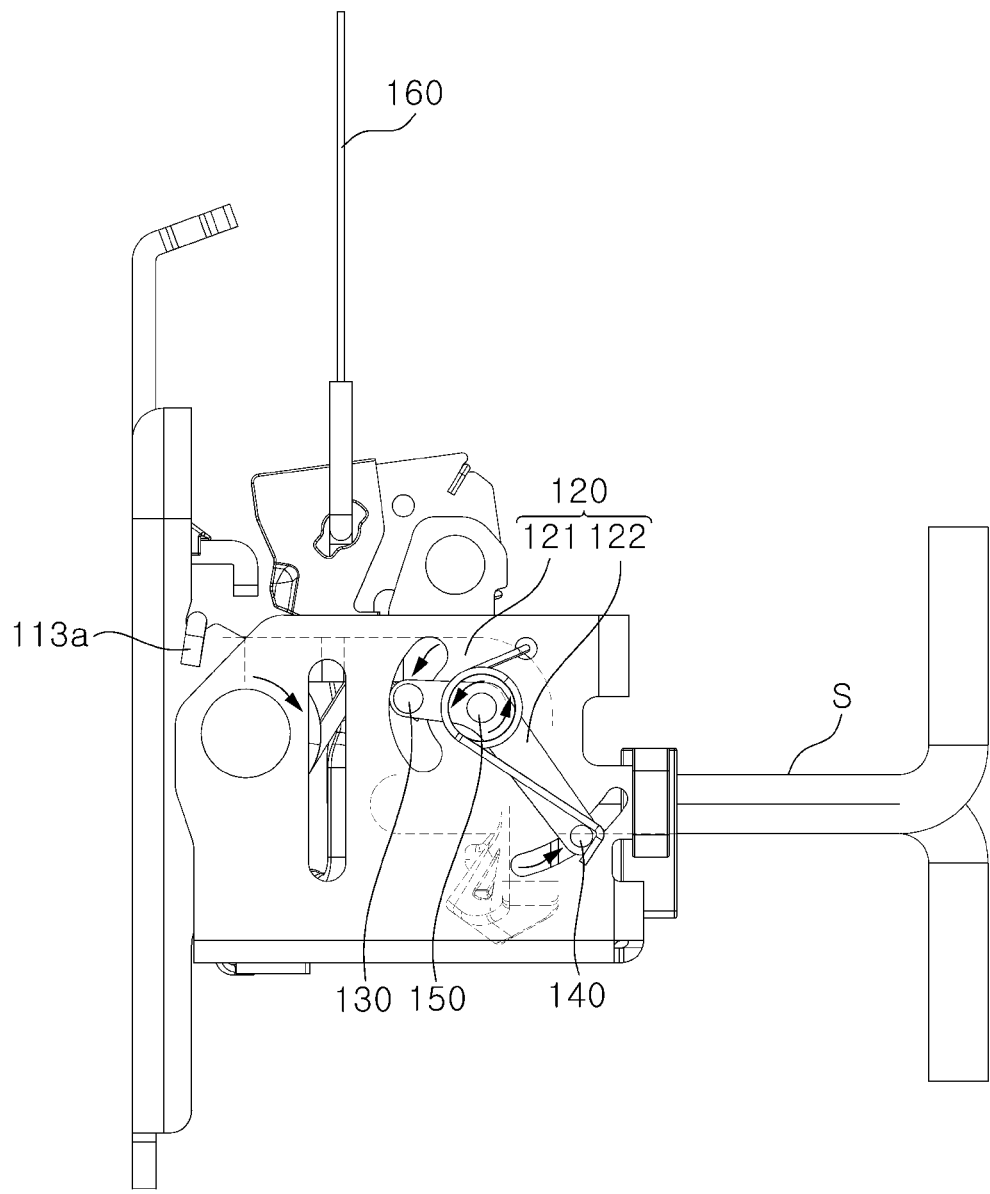
FIG. 6 is a side view of FIG. 5.

Next, referring to FIG. 5 and FIG. 6 that is the side view of FIG. 5, in the state of FIG. 3, when the force pulling the cable 160 is removed, the latch 120 is rotated downward by the return spring 113a. At this time, by the latch 120, the pushing bar 130 positioned below the body portion 121 is pressed downward. Next, the pressing bar 140 is moved upward with respect to the body of the link frame 150. Therefore, in a state in which the striker S is inserted into the fastening groove 122a of the claw portion 122, the striker S is pressed by the latch 120 positioned above the striker S and by the pressing bar 140 positioned below the striker S, so that a rattling noise is significantly reduced.

The expressions (including the terms, the visualized images, and so on) used in describing the embodiment of the present disclosure are not selected to impose any limitation on the technical idea of the present disclosure, and are selected only for the practical purpose of providing a full understanding of the technical idea thereof.

Furthermore, the preferred embodiment of the present disclosure is described above. However, it would be apparent to a person of ordinary skill in the art that a novel embodiment could be constructed on the basis of the preferred embodiment within the scope of the technical idea of the present disclosure.

Therefore, claims of the present disclosure are not limited by several expressions used in "DETAILED DESCRIPTION OF THE INVENTION" and the "accompanying drawings", and should be broadly interpreted in light of the technical idea that underlies "DETAILED DESCRIPTION OF THE INVENTION" and the "accompanying drawings".

What is claimed is:

1. A latch assembly comprising: a latch bracket mounted on a seatback frame;
   a latch having a rear side portion hinge-coupled to the latch bracket, having a front side portion bent downward, and having an end portion provided with a claw portion;
   a cable connected to an upper surface of the latch;
   a pushing bar positioned below the rear side portion of the latch;
   a pressing bar horizontally positioned below the claw portion; and
   a link frame connecting the pushing bar and the pressing bar to each other, the link frame being connected to the latch bracket, and the link frame being configured such that the pressing bar is moved upward when the pushing bar is pressed downward by the latch.

2. The latch assembly of claim 1, wherein the latch bracket comprises:
   a coupling portion mounted on the seatback frame; and
   a supporting plate portion provided vertically on a first side of the coupling portion, and
   a first end of the link frame is coupled to the pushing bar, a second end of the link frame is vertically coupled to the pressing bar, and a body of the link frame is hinge-coupled to the supporting plate portion.

3. The latch assembly of claim 2, further comprising a return spring, the return spring being configured such that a first end of the return spring is coupled to the supporting plate portion and a second end of the return spring is coupled to the pressing bar, and configured to apply an elastic restoring force downward to the pressing bar.

4. The latch assembly of claim 1, further comprising a return spring, the return spring being configured such that a first end of the return spring is coupled to the latch bracket and a second end of the return spring is coupled to the latch, and configured to apply an elastic restoring force downward to the latch.

5. The latch assembly of claim 2, wherein an end portion of the claw portion has a shape bent toward the coupling portion.

* * * * *